United States Patent
Marshall

(10) Patent No.: US 10,436,240 B2
(45) Date of Patent: Oct. 8, 2019

(54) FASTENING SYSTEM AND METHOD

(71) Applicant: THE BOEING COMPANY, Chicago, IL (US)

(72) Inventor: Travis Taylor Marshall, Saint Peters, MO (US)

(73) Assignee: The Boeing Company, Chicago, IL (US)

(*) Notice: Subject to any disclaimer, the term of this patent is extended or adjusted under 35 U.S.C. 154(b) by 176 days.

(21) Appl. No.: 15/147,998

(22) Filed: May 6, 2016

(65) Prior Publication Data
US 2017/0321741 A1 Nov. 9, 2017

(51) Int. Cl.
F16B 33/00 (2006.01)
F16B 39/22 (2006.01)
F16B 23/00 (2006.01)
B25B 13/48 (2006.01)
F16B 5/02 (2006.01)
F16B 35/04 (2006.01)

(52) U.S. Cl.
CPC .......... *F16B 39/225* (2013.01); *B25B 13/481* (2013.01); *F16B 5/02* (2013.01); *F16B 23/0007* (2013.01); *F16B 23/0038* (2013.01); *F16B 35/041* (2013.01)

(58) Field of Classification Search
CPC ........ F16B 23/00; F16B 35/04; F16B 35/041; F16B 35/042; F16B 2037/007; F16B 35/02; F16B 23/0007; F16B 23/0069; F16B 5/0283
USPC ......................................... 411/366.1, 395, 34
See application file for complete search history.

(56) References Cited

U.S. PATENT DOCUMENTS

| 1,247,235 | A | * | 11/1917 | Diss ..................... | F02M 61/168 184/38.1 |
| 2,789,597 | A | * | 4/1957 | La Torre ............. | B25B 27/0014 81/55 |
| 3,473,431 | A | | 10/1969 | King | |
| 4,836,062 | A | * | 6/1989 | LaTorre ............. | B25B 27/0007 81/13 |
| 5,207,545 | A | * | 5/1993 | Kochanski ............ | B25B 23/065 206/338 |
| 5,688,088 | A | * | 11/1997 | Watterback ............. | F16B 31/02 411/238 |
| 5,919,016 | A | * | 7/1999 | Smith ................... | F16B 37/067 411/183 |
| 6,095,736 | A | * | 8/2000 | Miller .................. | F16B 41/002 411/107 |

(Continued)

FOREIGN PATENT DOCUMENTS

GB 2281948 3/1995

OTHER PUBLICATIONS

Extended European Search Report for EP 17169407.8-1760, dated Oct. 6, 2017.

*Primary Examiner* — Gary W Estremsky
(74) *Attorney, Agent, or Firm* — Joseph M. Butscher; The Small Patent Law Group, LLC

(57) ABSTRACT

A fastening system is configured to be securely fastened from one side of at least one component. The fastening system includes a fastener including a shaft having a distal end extending from a head. A first channel is formed through the fastener between the head and the distal end. A nut is configured to be connected to the fastener. The nut includes a second channel that is coaxially aligned with the first channel.

14 Claims, 5 Drawing Sheets

(56) References Cited

U.S. PATENT DOCUMENTS

| | | | | |
|---|---|---|---|---|
| 6,167,663 B1 * | 1/2001 | Nakamoto | ............... | E06B 1/10 |
| | | | | 411/366.1 |
| 6,213,698 B1 * | 4/2001 | Cosenza | ............. | F16B 19/1063 |
| | | | | 411/34 |
| 6,224,309 B1 * | 5/2001 | Yamamoto | .......... | F16B 19/1072 |
| | | | | 411/11 |
| 6,247,731 B1 | 6/2001 | Stearns | | |
| 6,276,885 B1 * | 8/2001 | Yamanaka | ............. | B25B 13/48 |
| | | | | 411/403 |
| 6,499,925 B2 * | 12/2002 | Duran | .................. | F16B 5/0208 |
| | | | | 411/366.1 |
| 6,810,571 B1 * | 11/2004 | Junkers | ................ | B25B 13/488 |
| | | | | 29/446 |
| 6,868,757 B2 * | 3/2005 | Hufnagl | ............. | B25B 23/1415 |
| | | | | 411/38 |
| 7,174,811 B2 * | 2/2007 | Wright | .................. | B25B 13/065 |
| | | | | 411/403 |
| 7,987,637 B2 * | 8/2011 | Smith | ................... | F16B 5/0233 |
| | | | | 411/388 |
| 8,337,132 B2 * | 12/2012 | Steffenfauseweh | .. | B60Q 1/0433 |
| | | | | 403/408.1 |
| 8,931,992 B2 * | 1/2015 | Seiter | ................... | F16B 33/002 |
| | | | | 359/829 |
| 2006/0083602 A1 | 4/2006 | Lemire | | |
| 2011/0296961 A1 | 12/2011 | Ortiz | | |
| 2012/0174765 A1 * | 7/2012 | Kunda | ................... | F16B 5/025 |
| | | | | 89/36.08 |
| 2015/0344266 A1 * | 12/2015 | Inoue | ................... | B66B 1/3492 |
| | | | | 324/207.15 |
| 2015/0377266 A1 * | 12/2015 | Ortega Dona | ........ | F16B 5/0283 |
| | | | | 411/366.1 |
| 2016/0040704 A1 * | 2/2016 | Yun | ....................... | F16B 13/061 |
| | | | | 411/34 |

* cited by examiner

FASTENING SYSTEM AND METHOD

FIELD OF THE DISCLOSURE

Examples of the present disclosure generally relate to fastening systems and methods, and, more particularly, to fastening systems and methods that are configured to secure a fastener to a nut within confined spaces.

BACKGROUND OF THE DISCLOSURE

Various components are secured together through fasteners and nuts. For example, a fastener may be positioned within aligned through-holes of two components (such as panels). A nut threadably engages a distal end of the fastener. In general, the head of the fastener is engaged by a first tool while the nut is engaged with a second tool. The nut is held in position by the second tool, while the fastener is torqued in relation to the nut with the first tool, which secures the fastener to the nut, and thereby securely connects the two components together.

Notably, the fastener is engaged by the first tool on one side of the components, while the nut is engaged by the second tool on an opposite side of the components. During the manufacture of various structures, however, space may be limited on one or both sides of the components. As an example, an area around the nut that is used to secure components together may be restricted. An individual may find it difficult to grasp or otherwise engage the nut due to the restricted space around the nut.

Certain fastening methods use nut plates or cages that are configured to engage fasteners. However, the spaces around components that are to be secured together may not be readily accessible to an individual. Moreover, the space on one or both side of the components may be too small to accommodate a nut plate and/or a cage.

SUMMARY OF THE DISCLOSURE

A need exists for a system and method of efficiently securing a fastener to a nut within confined spaces. A need exists for a system and method of efficiently securing components together using a fastener and nut in which a tool is used to engage both the fastener and nut from one side of the components.

With those needs in mind, certain examples of the present disclosure provide a fastening system that is configured to be securely fastened from one side of at least one component. The fastening system includes a fastener including a shaft having a distal end extending from a head. A first channel is formed through the fastener between the head and the distal end. A nut is configured to be connected to the fastener. The nut includes a second channel that is coaxially aligned with the first channel.

At least a portion of the distal end may include external threads and the nut includes internal threads. The internal threads of the nut threadably engage the external threads of the fastener.

One of the fastener or the nut is configured to be internally engaged through the first channel or the second channel to threadably secure the nut to the fastener.

The fastening system may also include a first securing device having a portion that extends into the first and second channels. One of the first or second channels has a size and shape that conforms to an outer surface of the portion of the first securing device. In at least one example, the outer surface has a hexagonal cross-section.

The fastening system may also include a second securing device having an operative head that extends into the first channel. The operative head rotationally constrains the fastener. In at least one example, the operative head includes a passage formed therethrough. The portion of the first securing device extends through the passage.

The second channel may have a size and shape that conforms to an outer surface of a portion of a first securing device. In at least one example, the first securing device may be configured to rotationally constrain the nut.

The first channel may include a device-passage channel that is configured to allow a portion of a first securing device to radially move therein. The second channel may include a device-conforming channel that is configured to conform to a size and shape of an outer surface of the portion of the first securing device.

In at least one example, the nut is secured to a surface of the component(s) prior to contact with the fastener. For example, the nut may be secured to the surface of the component(s) through at least one of an adhesive, bonding, and a filament.

Certain examples of the present disclosure provide a fastening method that is configured to be performed from one side of at least one component. The fastening method includes positioning a distal end of a fastener with respect to a first side of the component(s), aligning the distal end of the fastener with an opening of the component(s), urging the distal end of the fastener into and through the opening of the component(s) from the first side, connecting a nut to the distal end of the fastener at a second side of the component(s) that is opposite from the first side, and urging a portion of a first securing device from the first side of the component(s) into a first channel formed through the fastener and a second channel formed through the nut. The urging includes rotationally constraining one of the fastener or the nut by the portion of the first securing device.

The method may also include rotationally restraining the other of the fastener or the nut that is not rotationally constrained by the first securing device, and rotating the first securing device to rotate the one of the fastener or the nut that is rotationally constrained by the first securing device. In at least one example, the rotationally restraining comprises using a second securing device having an operative head that extends into the first channel.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition may include additional elements not having that condition.

Examples of the present disclosure provide fastening systems and methods that may be configured to secure and remove fasteners with respect to nuts from one side or end, instead of both the fastener and the nut being grasped or engaged by separate tools. A securing device is used to internally engage one of the fastener or the nut in order to secure the nut to the fastener.

Examples of the present disclosure provide a fastening system and method that include a fastener and a nut. In at least one example, the fastener is a hollow fastener having a central channel formed therethrough. A securing device (such as a hex wrench) is configured to pass through the central channel and internally engage the nut. The securing device passes through the central channel from a first end and engages the nut on the opposite second end. The securing device may be operated from the first side or end to secure the nut to the fastener.

The fastener may be a screw, bolt, or the like. The fastener may include a raised head that is configured to extend over a component. In at least one example, the fastener may include a tapered or other such head that is configured to flush mount with respect an outer surface of a component.

Certain examples of the present disclosure provide a fastening system that includes a hollow fastener and a nut. A securing device is positioned through the hollow fastener and engages reciprocal features of the nut. The securing device is then rotated to rotate the nut with respect to the fastener, such that the nut threadably secures to the fastener. The securing device is operated to rotate the nut with respect to the fastener from the inside of the nut.

Certain examples of the present disclosure provide a fastening method that includes extending a securing device through a hollow fastener. The extending includes inserting the securing device through a head end of the fastener toward and through a distal threaded end of the fastener. The method also includes engaging a mating feature of a nut positioned on or otherwise proximate to the distal threaded end of the fastener with the securing device. The method also includes rotating the securing device to rotate the nut, thereby threadably securing the nut to the fastener.

Figure 1:
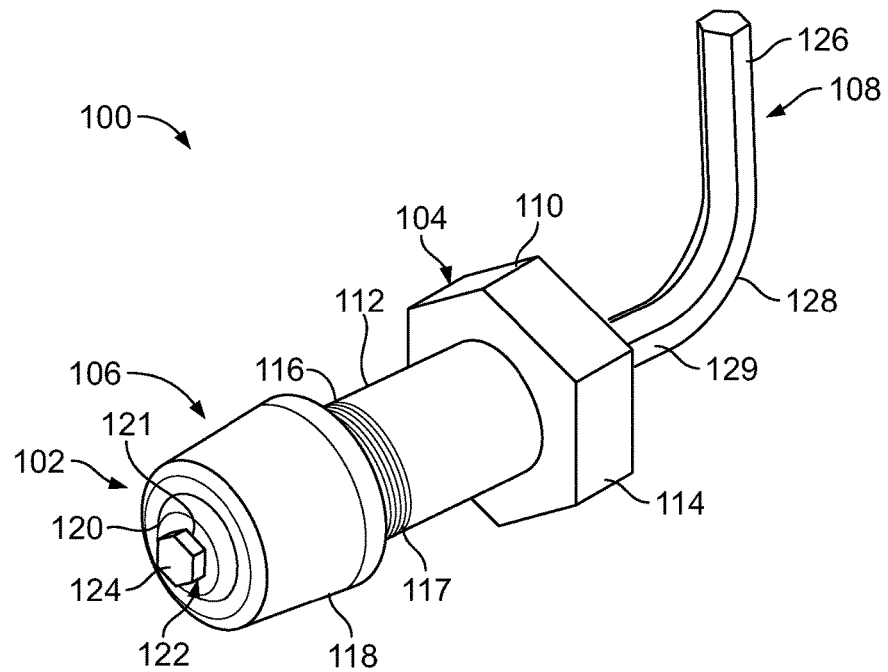
FIG. 1 illustrates a perspective view of a fastening system from a first end, according to an example of the present disclosure.

FIG. 1 illustrates a perspective view of a fastening system 100 from a first end 102, according to an example of the present disclosure. The fastening system 100 includes a fastener 104, a nut 106, and a securing device 108.

The fastener 104 includes a head 110 connected to a shaft 112. The head 110 may include an outer periphery 114. As shown in FIG. 1, the outer periphery 114 may be shaped as a hexagon. The outer periphery 114 is configured to be grasped by an individual, engaged by a tool (such as a hex wrench), and/or the like. Optionally, the outer periphery 114 may be shaped and sized other than shown. For example, the outer periphery 114 may be shaped as a square, octagon, triangle, circle, and/or the like.

The shaft 112 includes a distal end 116 that includes external threads 117. The threads 117 are configured to threadably engage reciprocal internal threads formed within the nut 106. The threads 117 may extend a longer or shorter distance over the outer surface of the shaft 112 than shown.

The nut 106 includes an annular outer wall 118 connected to an end cap 120. The outer wall 118 may be cylindrical, conical, and/or the like. Interior surfaces of the outer wall 118 include internal threads that are configured to threadably engage the threads 117 of the distal end 116 of the shaft 112.

Internal walls 121 of the nut 106 define a device-conforming channel 122 that is formed through at least a portion of the end cap 120. The device-conforming channel 122 may extend entirely through the end cap 120. Optionally, the end cap 120 may be closed ended such that the device-conforming channel 122 does not extend entirely through the end cap 120.

The device-conforming channel 122 is sized and shaped to reciprocally engage a distal end 124 of the securing device 108. For example, the device-conforming channel 122 may be hexagonal and configured to reciprocally engage a hexagonal outer surface of the distal end 124 of the securing device 108. Optionally, the device-conforming channel 122 may be sized and shaped differently than shown. For example, the device-conforming channel 122 may be sized and shaped as a square, if the distal end 124 of the securing device 108 has a square-shaped outer perimeter. As another example, the device-conforming channel 122 may be triangular in shape, if the distal end 124 of the securing device 108 has a triangular-shaped outer perimeter. In general, the device-conforming channel 122 may be sized and shaped to be complementary to the size and shape of the outer perimeter of the distal end 124 of the securing device 108.

The complementary interface between the device conforming channel 122 and the corresponding outer surface of the distal end 124 of the securing device 108 radially or otherwise rotationally links the nut 106 to the securing device 108 when the distal end 124 is positioned within the device-conforming channel 122. Thus, when the distal end 124 is retained within the device-conforming channel 122, rotational movement of the nut 106 is controlled and dictated by the securing device 108.

The securing device 108 may include a proximal end 126 that connects to the distal end 124. The proximal end 126 may connect to a bend 128 that couples to the proximal end 126 to the distal end 124 through an intermediate extension 129. The proximal end 126 may provide a handle that is configured to be grasped by an individual. As shown, the securing device 108 may include a hexagonal outer periphery. For example, an axial cross-section of the securing device 108 may be hexagonal. Optionally, less than all of the securing device 108 may include a hexagonal axial cross-section. For example, the distal end 124 of the securing device may have a hexagonal axial cross-section, but the proximal end 126 and/or the bend 128 may include a different axial cross-section.

Optionally, the securing device 108 may not include the bend 128. Instead, the securing device 108 may be formed as a linear device having a linear longitudinal axis. In at least one example, the securing device 108 may be configured to be secured to a tool, such as a drill. In at least one example, the securing device 108 may be a drill bit. Further, as noted above, the distal end 124 may have a different axial cross-section than shown.

The shape of the outer periphery of the distal end 124 is complementary or otherwise corresponds to the shape of the device-conforming channel 122 of the nut 106. As such, the device-conforming channel 122 receives and rotationally constrains the distal end 124 of the securing device in a radial direction, so that rotation of the securing device 108 causes a corresponding rotation of the nut 106. When the distal end 124 of the securing device 108 extends into and/or through the device-conforming channel 122 of the nut 106, the nut 106 is constrained in a radial direction by the securing device 108.

Figure 2:
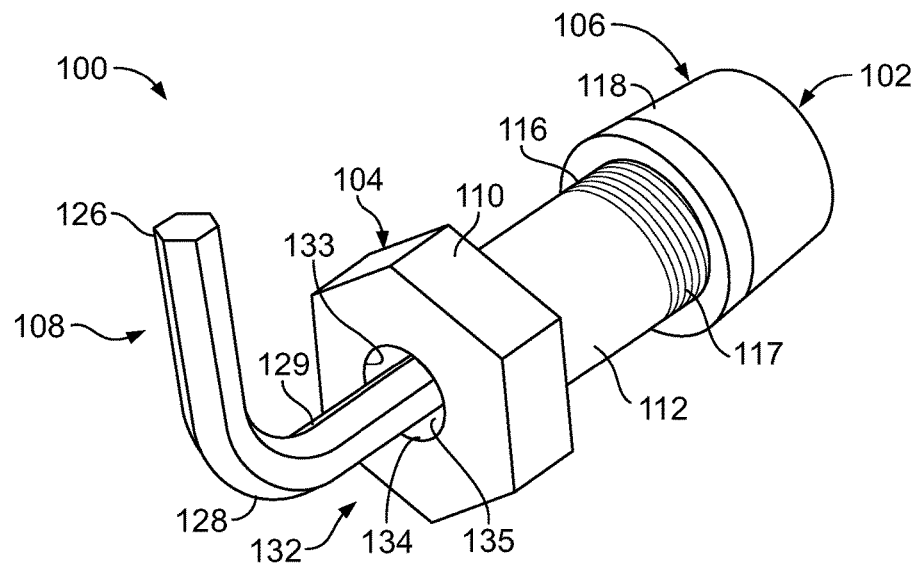
FIG. 2 illustrates a perspective view of a fastening system from a second end, according to an example of the present disclosure.

FIG. 2 illustrates a perspective view of the fastening system 100 from a second end 132, according to an example of the present disclosure. The second end 132 is opposite from the first end 102. As shown, the nut 106 is at the first end 102, while the head 110 of the fastener 104 is proximate to the second end 132. It is to be understood that the terms first and second are merely used to indicate a number of features. For example, the first end 102 may be a second end, while the second end 132 may be a first end.

The fastener 104 may be hollow, and include internal walls 133 that define a central, internal device-passage channel 134 that is formed through the fastener 104. The device-passage channel 134 extends from and through the head 110 to and through the distal end 116. The device-passage channel 134 includes an axial cross-section that differs from that of the device-conforming channel 122 of the nut 106. For example, the device-passage channel 134 may include a circular cross-section. A clearance space 135 may be formed between the internal walls 133 that define the device-passage channel 134 and an outer surface of the securing device 108. In at least one other example, the internal walls 133 may touch the securing device 108, but may not conform thereto. As such, the device-passage channel 134 does not securely engage the securing device 108. For example, the smooth, circular internal diameter of the fastener 104 that defines the device-passage channel 134 allows the securing device 108 to extend therethrough, but does not radially or otherwise rotationally constrain the securing device 108. Accordingly, rotation of the securing device 108 may not cause a corresponding rotation of the fastener 104.

Referring to FIGS. 1 and 2, the fastener 104 and the nut 106 may be coaxial. Accordingly, the center of the device-conforming channel 122 may be coaxially aligned with a longitudinal axis of the fastener 104. Further, the distal end 124 and the extension 129 of the securing device 108 may also be coaxial with the fastener 104 and the nut 106.

Figure 3:
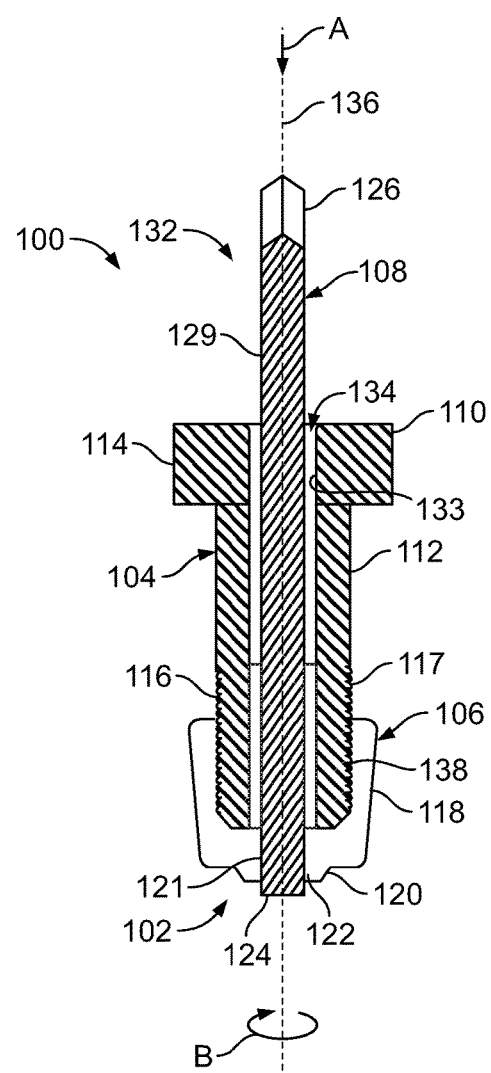
FIG. 3 illustrates an axial cross-sectional view of a fastening system, according to an example of the present disclosure.

FIG. 3 illustrates an axial cross-sectional view of the fastening system 100, according to an example of the present disclosure. A central longitudinal axis 136 is common to the distal end 124 and the extension 129 of the securing device 108, as well as the fastener 104 and the nut 106.

As shown in FIG. 3, the device-passage channel 134 formed through the fastener 104 may not engage an outer surface of the securing device 108. The device-passage channel 134 is not complementary to the outer surface of the securing device 108. As such, when the securing device 108 is rotated, the fastener 104 generally does not rotate in a corresponding manner.

In contrast, the device-conforming channel 122 formed through the nut 106 is sized and shaped to be complementary to the outer surface of the distal end 124 of the securing device 108. The distal end 124 is positioned through the device-conforming channel 122 such that the complementary interface between the distal end 124 and the nut 106 radially locks the nut 106 to the securing device 108. Accordingly, rotation of the securing device 108 about the longitudinal axis 136 causes a corresponding rotation of the nut 106.

In operation, the nut 106 may first be coupled to the distal end 116 of the fastener 104. As shown, the nut 106 may be threaded onto the distal end 116 such that internal threads 138 of the nut 106 threadably engage the outer threads 117 of the distal end 116 of the fastener 104.

After the nut 106 is initially connected to the fastener 104, the distal end 124 of the securing device 108 is urged into the device-passage channel 134 of the fastener 104 through the head 110 in the direction of arrow A. The securing device 108 continues to be urged in the direction of arrow A, until the distal end 124 passes out of the device-passage channel 134 and into the aligned complementary device-conforming channel 122 of the nut 106.

In order to fully secure the nut 106 to the fastener 104, the fastener 104 may be rotationally restrained (for example, held in a fixed radial position) such as by an individual grasping the head 110 with fingers or a tool. As the fastener 104 is rotationally restrained, the securing device 108 is then rotated in a securing direction (as shown by arc B) about the longitudinal axis 136. As the securing device 108 is rotated, the nut 106 rotates in response thereto, while the fastener 104 remains stationary (as the device-conforming channel 122 of the nut 106 is complementary to the securing device 108, but the securing device 108 freely rotates within the internal device-passage channel 134 formed through fastener 104). As the securing device 108 rotates the nut 106 in relation to the fastener 104, the nut 106 is secured (for example, tightened) to the distal end 116 of the fastener 104. After the nut 106 is secured to the fastener 104, the fastener 104 is released, and the securing device 108 is removed from the fastener 104 and the nut 106 in a direction that is opposite from arrow A.

In order to disengage the nut 106 from the fastener 104, the securing device 108 may be positioned through the fastener 104 and the nut 106 as shown. The fastener 104 may then be rotationally restrained, and the securing device 108 may be rotated about the longitudinal axis 136 in a direction that is opposite from arc B.

Alternatively, the internal device-passage channel 134 of the fastener 104 may be sized and shaped to be rotationally constrained by the securing device 108, while the nut 106 is not rotationally constrained by the securing device. For example, the internal channel 134 may have a complementary size and shape that corresponds to the outer surface of the securing device 108, while the device-conforming channel 122 of the nut 106 may be cylindrical. In this example, the nut 106 may be fixed to a structure, such as a panel, and the securing device 108 may be rotated, thereby causing a corresponding rotation in the fastener 104, which secures the fastener 104 to the nut 106.

Figure 4:
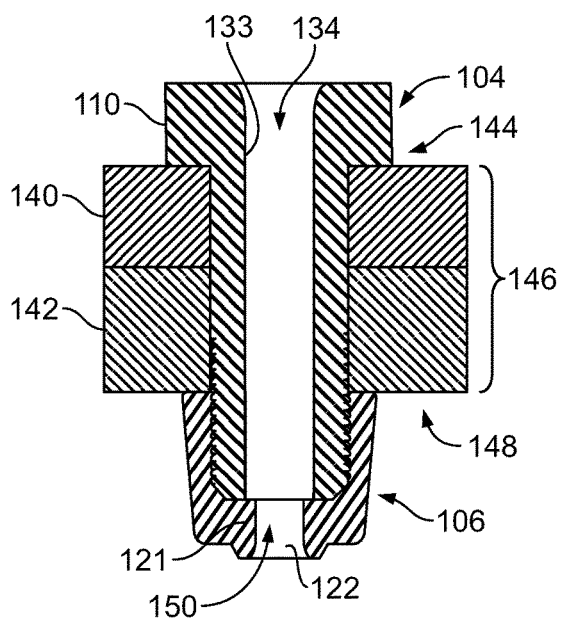
FIG. 4 illustrates an axial cross-sectional view of first and second components secured together through a fastener and a nut, according to an example of the present disclosure.

FIG. 4 illustrates an axial cross-sectional view of first and second components 140 and 142 secured together through the fastener 104 and the nut 106, according to an example of the present disclosure. Referring to FIGS. 3 and 4, the securing device 108 is used to secure the nut 106 to the fastener 104, as described above. An individual may secure the nut 106 to the fastener 104 by engaging the head 110 of the fastener 104 from a first side 144 of an assembly 146 that includes the components 140 and 142, and insert the securing device 108 through the fastener 104 and the nut 106 from the first side 144. The individual may then rotate the securing device 108 from the first side 144 to secure and/or disconnect the nut 106 from the fastener 104. In this manner, the individual need not engage an outer portion of the nut 106 from a second side 148 of the assembly 146. Instead, the securing device 108 passes through the internal device-passage channel 134 of the fastener 104 and the device-conforming channel 122 of the nut 106, and internally engages the nut 106 to secure and/or disconnect the nut 106 from the fastener 104.

After the securing device 108 is removed from the fastener 104 and the nut 106, the aligned device-passage channel 134 and the device-conforming channel 122 provides an open passage 150. The open passage 150 may be left open. The open passage 150 may provide a drain through the assembly 146, for example. Optionally, the open passage 150 may be plugged, such as with a sealant, a set screw, and/or the like.

Figure 5:
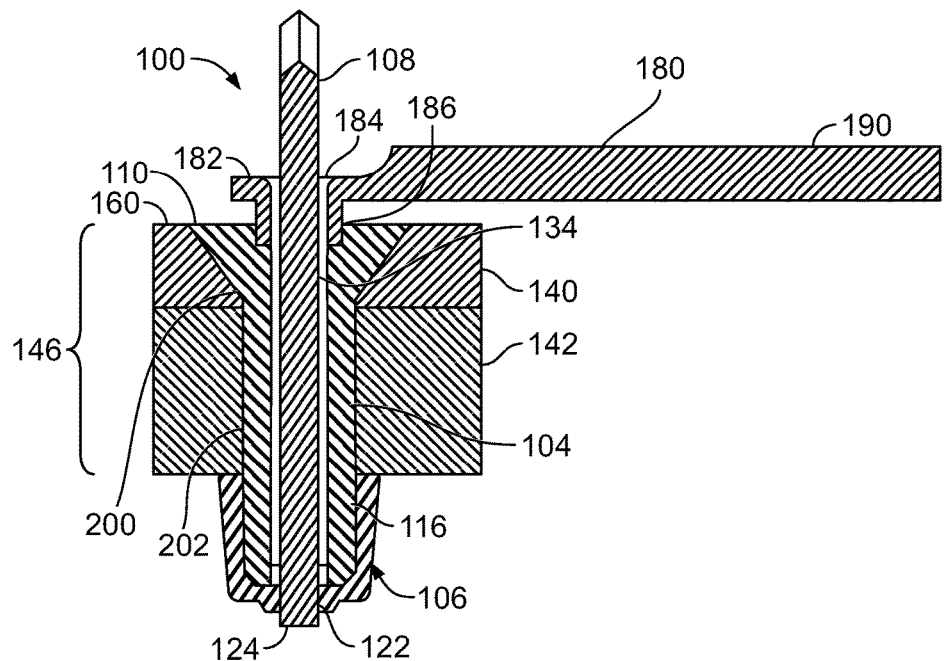
FIG. 5 illustrates an axial cross-sectional view of a fastening system coupled to an assembly, according to an example of the present disclosure.
Figure 6:
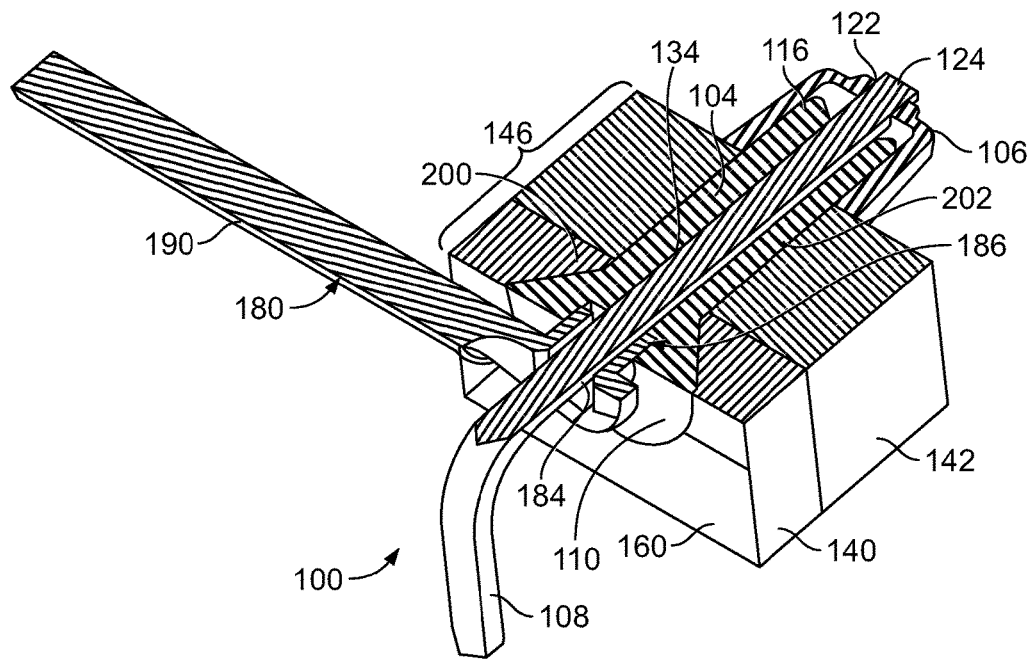
FIG. 6 illustrates a perspective, partial internal view of a fastening system coupled to an assembly, according to an example of the present disclosure.

FIG. 5 illustrates an axial cross-sectional view of the fastening system 100 coupled to the assembly 146, according to an example of the present disclosure. FIG. 6 illustrates a perspective, partial internal view of the fastening system 100 coupled to the assembly 146. Referring to FIGS. 5 and 6, in this example, the head 110 of the fastener 104 is configured to be flush with an outer surface 160 of the component 140.

A securing device 180 is used to rotationally constrain the fastener 104. The securing device 180 comprises an operative head 182 having a passage 184 formed therethrough. An outer surface of the operative head 182 is complementary to a head channel portion 186 formed through the device-passage channel 134. For example, the outer surface of the operative head 182 may have a hexagonal shape, while the head channel portion 186 may be defined by internal walls that have an axial cross-section that is also hexagonal and configured to conform around the operative head 182. Thus, when the operative head 182 is positioned within the head channel portion 186, the fastener 104 is rotationally constrained by the securing device 180. The operative head 182 may be connected to a handle 190.

In operation, the fastener 104 is positioned through axially aligned openings 200 and 202 formed through the components 140 and 142. The nut 106 may then be connected to the distal end 116 of the fastener 104, as described above. The operative head 182 of the securing device 180 is then positioned within the head channel portion 186. The distal end 124 of the securing device 108 is then passed through the non-conforming passage 184 of the securing device 180, the device-passage channel 134 of the fastener 104, and the device-conforming channel 122 formed through the nut 106.

The securing device 180 is then used to hold the fastener 104 in a radially-constrained position (for example, a locked position) while the securing device 108 is used to secure the nut 106 to the fastener 104, as described above. Optionally, the securing device 108 may be held in position to hold the nut 106 in a radially-constrained position, while the securing device 180 is used to rotate the fastener 104 in relation to the nut 106, in order to secure the nut 106 to the fastener 104.

Figure 7:
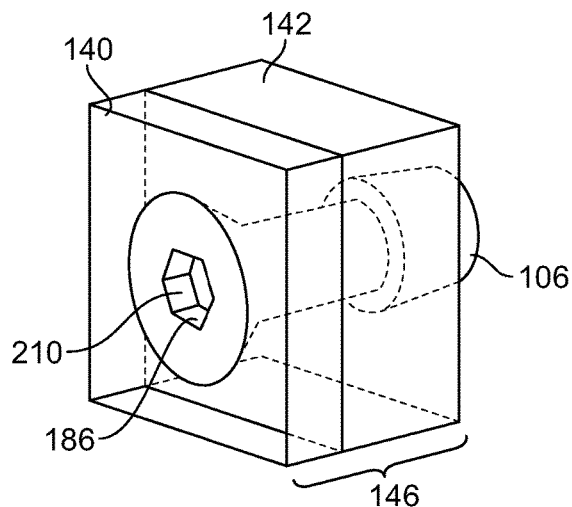
FIG. 7 illustrates a perspective, partial internal view of an assembly secured together by a fastener and a nut, according to an example of the present disclosure.

FIG. 7 illustrates a perspective, partial internal view of the assembly 146 secured together by the fastener 104 and the nut 106, according to an example of the present disclosure. As shown, the head channel portion 186 is defined by internal walls 210 that are configured to conform to an outer surface of operative head 182 (shown in FIGS. 5 and 6). For example, the internal walls 210 may form a hexagonal head channel portion 186 that conforms to an outer hexagonal shape of the operative head 182.

Figure 8:
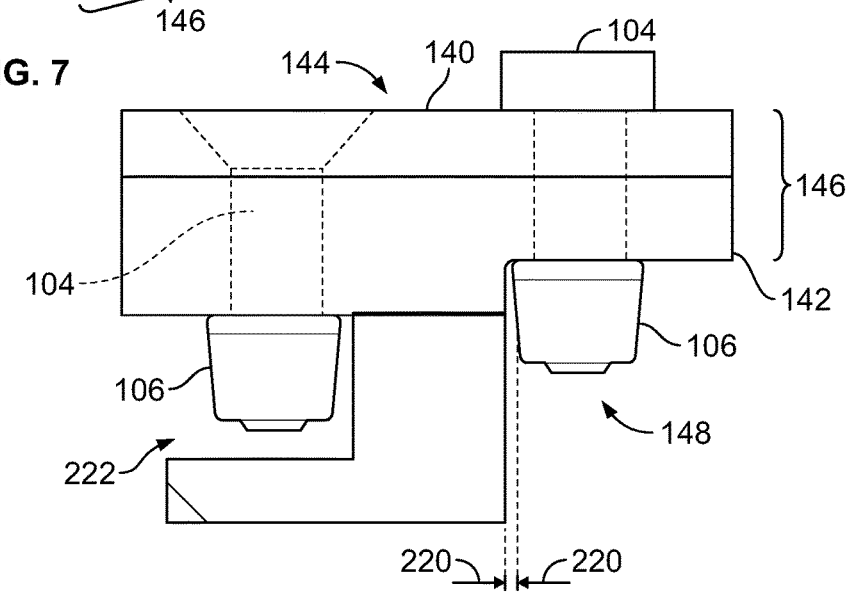
FIG. 8 illustrates a lateral view of an assembly secured together by fasteners and nuts, according to an example of the present disclosure.

FIG. 8 illustrates a lateral view of the assembly 146 secured together by fasteners 104 and nuts 106, according to an example of the present disclosure. As shown, the second side 148 of the assembly 146 may include restricted spaces 220 and 222. An individual may be unable to engage outer surfaces of the nuts 106 from the second side 148. Further, an individual may be unable to engage the nuts 106 with a tool from the second side 148. Referring to FIGS. 1-8, the fastening systems 100 shown and described above allow the nuts 106 to be securely connected to the fasteners 104 from the first side 144. For example, the securing devices 108 and/or 180 described above allow an individual to securely connect the nuts 106 to the fasteners 104 without engaging outer portions of the nuts 106.

Figure 9:
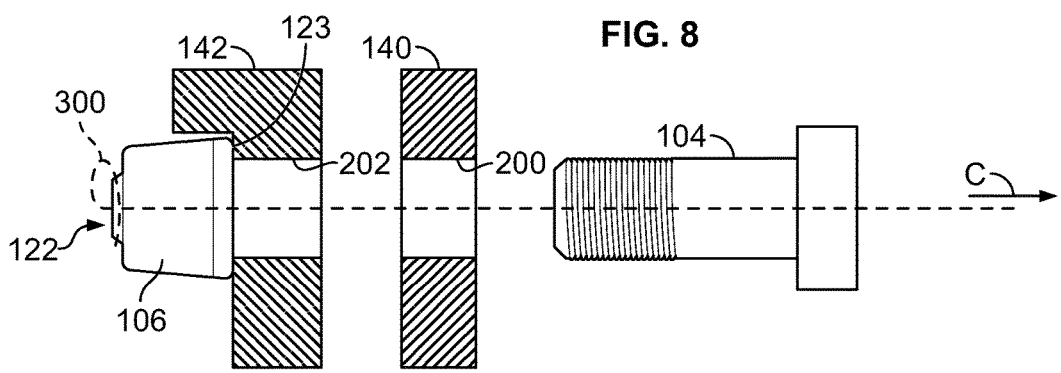
FIG. 9 illustrates a lateral view of a fastener aligned with a nut and openings through components, according to an example of the present disclosure.

FIG. 9 illustrates a lateral view of the fastener 104 aligned with a nut 106 and openings 200 and 202 through components 140 and 142, respectively, according to an example of the present disclosure. In this example, the nut 106 may be initially secured to the component 142. For example, the device-conforming channel 122 of the nut 106 may be axially aligned with the opening 202 of the component 142, and a lower edge 123 of the outer wall 118 of the nut 106 may be secured to a surface of the component 142 surrounding the opening 202, such as through adhesives, bonding, and/or the like.

In at least one example, a filament 300 (such as a string, wire, or the like) may be used to hold the nut 106 in position until the fastener 104 initially mates with the nut 106. After the fastener 104 connects to the nut 106 (such as through a threaded engagement therebetween), the filament 300 may be removed in the direction of arrow C through the device-conforming channel 122 and the device-passage channel 134 (shown in FIGS. 3 and 4, for example). In at least one other example, the nut 106 may be held in place through adhesives, bonding, the filament 300, and/or the like, and the securing device 108 (shown in FIGS. 1-6) may be configured to radially constrain the fastener 104, so that the fastener 104 may be rotated by the securing device 108 to secure to the nut 106, which may be fixed in place on the component 142.

Figure 10:
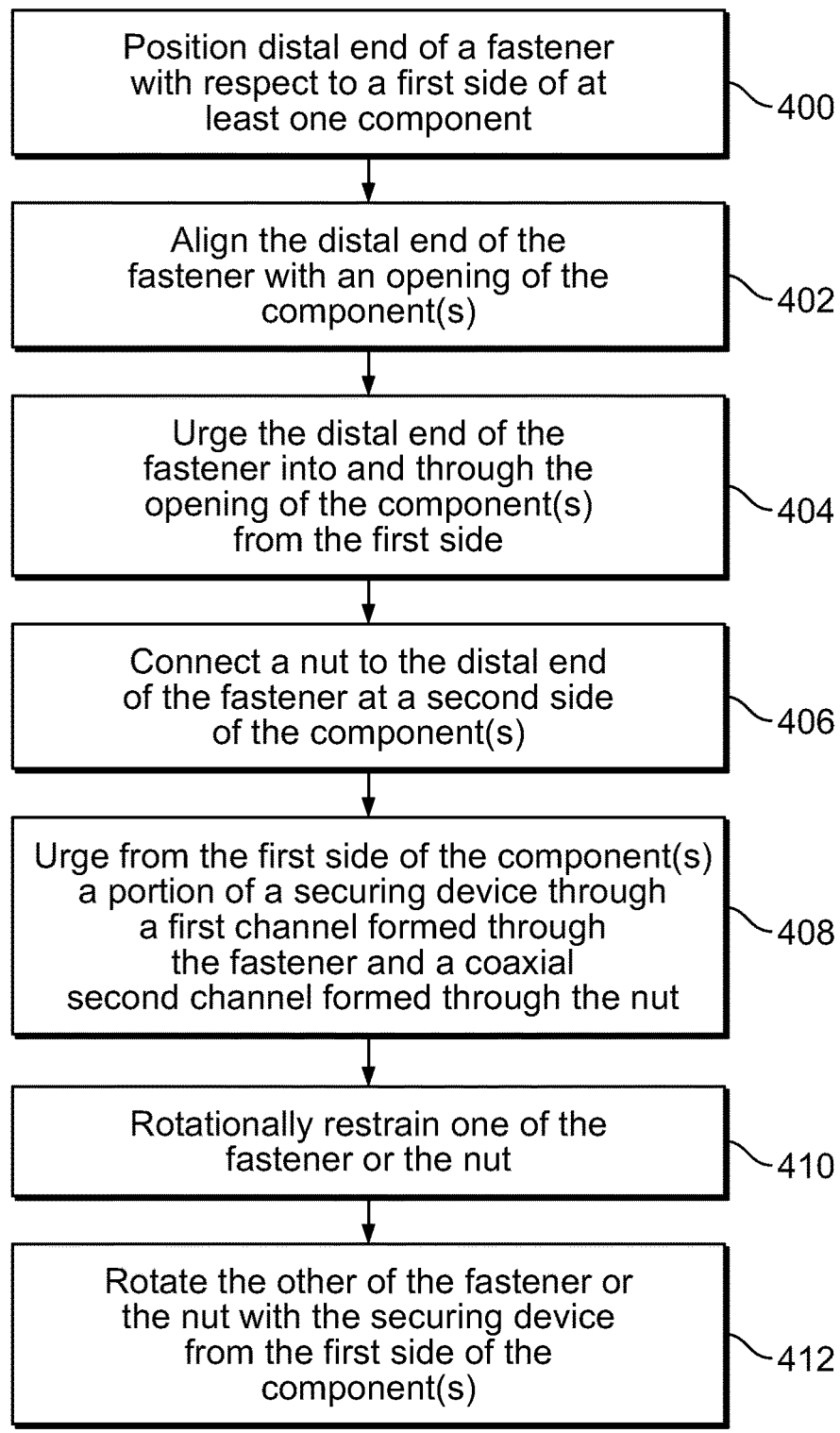
FIG. 10 illustrates a flow chart of a method of securing a nut to a fastener, according to an example of the present disclosure.

FIG. 10 illustrates a flow chart of a method of securing a nut to a fastener, according to an example of the present disclosure. The method begins at 400, in which a distal end of a fastener is positioned with respect to a first side of at least one component. For example, the distal end may be positioned over opening of the component(s) from the first side.

At 402, the distal end of the fastener is aligned with the opening of the component. For example, the distal end of the fastener is coaxially aligned with the opening.

At 404, the distal end of the fastener is urged into and through the opening of the component(s) from the first side. A head of the fastener may seat on a surface of the component(s) that surrounds the opening. In at least one other example, the head may flush mount with the surface of the component(s) that surrounds the opening.

At 406, a nut is connected to the distal end of the fastener at a second side of the component(s). For example, an individual may initially thread the nut onto the distal end of the fastener. In at least one other example, the nut may be secured to the component, such as through adhesives, bonding, a filament, and/or the like.

At 408, a portion of a securing device (such as a hex wrench) is urged from the first of the component(s) through a first internal channel formed through the fastener and a coaxial second internal channel formed through the nut. Either the first channel or the second channel conforms to an outer surface of the portion of the securing device, such that either the fastener or nut is rotationally constrained by the securing device. The other of the fastener or the nut is not rotationally constrained by the securing device.

At 410, one of the fastener or the nut is rotationally restrained. For example, a head of the fastener may be held by an individual, or with another securing device. In at least one example, the other securing device may include an operative head having an outer surface that fits within and conforms to a shape of a portion of the first channel. The operative head includes a passage through which the portion of the first securing device passes.

At 412, the fastener or the nut is rotated by the securing device from the first side. The securing device rotates the fastener or nut relative to the other. In this manner, the nut is securely tightened to the fastener.

Examples of the present disclosure provide fastening systems and methods that allow a fastener to be secured to a nut from one end thereof (and from one side of a component or assembly). The fastening systems and methods do not require nut plates, extra holes, or rivets in order to secure the fastener to the nut. One of the nut or the fastener is configured to be internally engaged by a first securing device, which is used to internally rotate the nut relative to the fastener. Another securing device (for example, a second securing device) having a hollow operative head may be used to radially constrain the fastener. The first securing device is configured to pass through the hollow operative head and internally engage the nut, for example.

As described above, examples of the present disclosure provide systems and methods of efficiently securing a fastener to a nut within confined spaces. Examples of the present disclosure provide systems and methods of efficiently securing one or more components using a fastener and nut in which a securing device is used to engage both the fastener and nut from one side.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A fastening system that is configured to be securely fastened from one side of at least one component, the fastening system comprising:
   a fastener including a shaft having a distal end extending from a head, wherein a first channel is formed through the fastener between the head and the distal end;
   a nut that is configured to be connected to the fastener, wherein the nut includes a second channel that is coaxially aligned with the first channel;
   a first securing device having a portion that extends into the first and second channels, wherein one of the first or second channels has a size and shape that conforms to an outer surface of the portion of the first securing device, wherein the outer surface has a hexagonal cross-section; and
   a second securing device having an operative head that extends into the first channel, wherein the operative head rotationally constrains the fastener, wherein the operative head comprises a passage formed therethrough, and wherein the portion of the first securing device extends through the passage.

2. The fastening system of claim 1, wherein at least a portion of the distal end includes external threads and the nut includes internal threads, and wherein the internal threads of the nut threadably engage the external threads of the fastener.

3. The fastening system of claim 1, wherein one of the fastener or the nut is configured to be internally engaged through the first channel or the second channel to threadably secure the nut to the fastener.

4. The fastening system of claim 1, wherein the second channel has a size and shape that conforms to the outer surface of the portion of the first securing device, and wherein the first securing device is configured to rotationally constrain the nut.

5. The fastening system of claim 1, wherein the first channel includes a device-passage channel that is configured to allow the portion of the first securing device to move therein, and wherein the second channel includes a device-conforming channel that is configured to conform to a size and shape of the outer surface of the portion of the first securing device.

6. The fastening system of claim 1, wherein the nut is configured to be secured to a surface of the at least one component prior to contact with the fastener.

7. The fastening system of claim 6, wherein the nut is configured to be secured to the surface of the at least one component through at least one of an adhesive, bonding, and a filament.

8. A fastening system that is configured to be securely fastened from one side of at least one component, the fastening system comprising:
   a fastener including a shaft having a distal end and external threads extending from a head, wherein a device-passage channel is formed through the fastener between the head and the distal end;
   a nut including internal threads and a device-conforming channel, wherein the device-passage channel is coaxially aligned with the device-conforming channel, and wherein the internal threads of the nut engage the external threads of the fastener;
   a first securing device having a portion that extends into the device-passage channel and the device-conforming channel, wherein the device-passage channel allows the portion of the first securing device to move therein, wherein the device-conforming channel has a size and shape that conforms to an outer surface of the portion of the first securing device, wherein the outer surface has a hexagonal cross-section and wherein the outer surface of the portion of the first securing device is configured to internally engage the nut through the device-conforming channel and rotate the nut relative to the fastener to threadably secure the nut to the fastener; and
   a second securing device having an operative head that extends into the device-passage channel, wherein the operative head rotationally constrains the fastener, wherein the operative head comprises a passage formed therethrough, and wherein the portion of the first securing device extends through the passage.

9. A fastening method that is configured to be performed from one side of at least one component, the fastening method comprising:
   positioning a distal end of a fastener with respect to a first side of the at least one component;
   aligning the distal end of the fastener with an opening of the at least one component;
   urging the distal end of the fastener into and through the opening of the at least one component from the first side;
   connecting a nut to the distal end of the fastener at a second side of the at least one component that is opposite from the first side;
   urging a portion of a first securing device from the first side of the at least one component into a first channel formed through the fastener and a second channel formed through the nut, wherein one of the first or second channels has a size and shape that conforms to an outer surface of the portion of the first securing device, wherein the outer surface has a hexagonal cross-section, wherein the urging comprises rotationally constraining one of the fastener or the nut by the portion of the first securing device, and wherein the rotationally constraining comprises using a second securing device having an operative head that extends into the first channel; and
   extending the portion of the first securing device through a passage formed through the operative head of the second securing device.

10. The fastening method of claim 9, further comprising:
    rotationally constraining the other of the fastener or the nut that is not rotationally constrained by the first securing device; and
    rotating the first securing device to rotate the one of the fastener or the nut that is rotationally constrained by the first securing device.

11. The fastening method of claim 10, wherein the rotating the first securing device comprises threadably engaging internal threads of the nut with external threads of the fastener.

12. The fastening method of claim 9, wherein the first channel includes a device-passage channel that is configured to allow the portion of the first securing device to radially move therein, and wherein the second channel includes a device-conforming channel that is configured to conform to a size and shape of the outer surface of the portion of first securing device.

13. The fastening method of claim 9, further comprising securing the nut to the second side of the at least one component, and wherein the securing the nut to the second side of the at least one component comprises securing the nut to the second side through at least one of an adhesive, bonding, and a filament.

14. The fastening system of claim 1, wherein the portion of the first securing device that extends into the first and second channels rotationally constrains one of the fastener or the nut.

* * * * *